United States Patent [19]
Anderson, Jr. et al.

[11] 3,811,117
[45] May 14, 1974

[54] TIME ORDERED MEMORY SYSTEM AND OPERATION

[75] Inventors: Robert Douglas Anderson, Jr.; Howard Leo Kalter, both of Colchester, Vt.

[73] Assignee: International Business Machines Corporation, Armonk, N.Y.

[22] Filed: Oct. 19, 1972

[21] Appl. No.: 298,918

[52] U.S. Cl. ........................ 340/173 DR, 340/172.5
[51] Int. Cl. ........................ G11c 11/40
[58] Field of Search ........................ 340/173 DR, 172.5

[56] References Cited

UNITED STATES PATENTS 3,737,879 6/1973 Greene ........................ 340/173 DR

*Primary Examiner*—Terrell W. Fears
*Attorney, Agent, or Firm*—Howard J. Walter, Jr.

[57] ABSTRACT

An array of memory cells in which stored information must be periodically restored in order to maintain its viability may have the restore operation carried out without interruption of the memory in most instances. The memory array is divided into a plurality of segments (e.g., on a word line basis), with the memory cells of each segment being restored as a group. Means for accessing the memory cells in the array and a pulse source for actuating the accessing means are provided. A time ordered list of segments in the array in the order of which they were last restored is maintained and updated as a particular segment is restored in, e.g., a plurality of counters or an associative memory. One of the segments of the memory is restored in each of a plurality of time intervals, each corresponding to the memory cycle time. Means for restoring the memory cells is actuated for a particular segment of the array each time an access to a portion of the memory included within that segment is made. The means for restoring is independently actuable during a time interval in which access to the memory is not being made to restore that segment of the array which had been previously restored least recently.

17 Claims, 7 Drawing Figures

← MEMORY STARTS

| SEGMENT | $T_0$ | $T_1$ | $T_2$ | $T_3$ | $T_4$ | $T_5$ | $T_6$ |
|---|---|---|---|---|---|---|---|
| 22 | 3 | 0 | 1 | 0 | 0 | 1 | 2 |
| 24 | 2 | 3 | 4 | 5 | 6 | 0 | 1 |
| 26 | 1 | 2 | 0 | 1 | 2 | 3 | 4 |
| 28 | 0 | 1 | 2 | 3 | 4 | 5 | 0 |
| USER ADDRESS | | — | 26 | 22 | 22 | X | 28 |
| GENERATED ADDRESS | 22 | — | — | — | 24 | — | |

TIME ORDERED MEMORY SYSTEM AND OPERATION

CROSS REFERENCE TO RELATED APPLICATION

This application covers an improvement in a copending, concurrently filed, commonly assigned application by Stephen B. Behman and Stephen Goldstein, entitled, "Memory System Restoration." filed Oct. 19, 1972, Ser. No. 298,917.

BACKGROUND OF THE INVENTION

1. Field of the Invention

This invention relates to memory systems containing an array of memory elements in which information stored in the elements must be periodically restored in order to maintain its viability. More particularly, it relates to such a memory system in which restoration of information stored in the memory array may be carried out without interfering with normal memory operation in most instances. This is done by restoring each time an access is made and by carrying out restoration at times the memory is otherwise idle on the basis of a time ordered previous restoration sequence. As used herein, the term "access" is meant to include either a write or a read operation.

2. Description of the Prior Art

The necessity for periodic restoration of information stored in, e.g., capacitive storage elements is well known. Dennard, commonly assigned U.S. Pat. No. 3,387,286 discloses two ways in which such restoration may be carried out. Restoration may be interleaved with normal memory operation by using, for example, every tenth cycle of the memory to restore one of the word positions in the array. Alternatively, Dennard teaches restoration in a burst mode by interruption of normal memory operation and restoration of the information in the entire memory during the interruption. Either approach accomplishes the desired restoration satisfactorily, but both have an effect on operation of a system incorporating a memory using these schemes, since it is necessary to interfere with normal memory operation while the restoration is being carried out.

The memory cell in the Dennard patent is extremely simple, consisting of a capacitive storage element gated by a field effect transistor (FET). Such a memory cell has great potential for use in inexpensive, large capacity integrated circuit memories, due to its inherent simplicity. To meet the goal of low cost, it is essential that a memory cell be small in integrated circuit technology. However, reductions in size result in reduction in the capacitance of the storage element. The smaller the capacitance, the more often is restoration necessary. If restoration is carried out in accordance with the prior art schemes, restoring more often means a decrease in memory system performance, because the memory will be available for normal reading or writing operations a smaller percentage of the time. It should therefore be readily apparent that there remains a need to minimize the effect of data restoration on operation of a system including a memory requiring periodic restoration.

SUMMARY OF THE INVENTION

Accordingly, it is an object of this invention to provide a dynamic storage memory in which periodic restoration of information is carried out internally to the memory and without interfering with system operating in usual situations.

It is another object of the invention to provide a memory of the type requiring periodic restoration of information in which the restoration is carried out in a time ordered sequence of previous restoration and in a manner which usually avoids interruption of normal memory operation.

It is a further object to provide a memory requiring periodic restoration of stored information in which restoration is carried out simultaneously with a normal access operation and on a time ordered basis of previous restoration when no access to the memory is being made.

The attainment of these and related objects may be achieved through use of the memory system and method of operating a memory herein disclosed. The memory system in accordance with this invention includes an array of memory cells in which stored information must be periodically restored. The array is divided into a plurality of segments, with the memory cells of each segment being restored as a group. Means is provided for accessing the memory cells in the array, together with a pulse source means for actuating the accessing means. In order to establish the required priority of segments for restoration based on the last time a particular segment was restored, means is provided for maintaining a time ordered list of segments in the array in the order of their last restoration and for updating the list as a particular segment is restored. Means is provided for restoring the memory cells in each segment of the array in a plurality of time intervals, each time interval desirably corresponding to the memory cycle time, with the number of time intervals being greater than required for restoration of all of the segments. The means for restoring is actuated for a particular segment of the array each time an access to a portion of the array within that segment is made. It is also independently actuable to restore segments of the memory in the sequence of the time ordered list during the time intervals in the absence of an access to any segment of the array.

By restoring each segment of the memory each time an access to a portion of the memory within the segment is made and restoring that segment of the memory least recently restored during a time interval in which no access to the memory is being made, it is possible to mask the restoration operation a high percentage of the time so that the memory cycle time approaches the active cycle time. The memory system may be 100 percent available if accesses are either to random storage devices or to different devices in a sequence.

If a particular memory system is accessing a few storage devices a high percentage of the cycle time intervals for the memory, and accesses are being made to the memory in a high percentage of the access time intervals, it may not be possible to carry out all restore operations without disturbing normal memory operation. It occasionally may be necessary to inhibit access to the memory during a time interval in which the maximum length of time that a segment may retain information without losing its viability has occurred in order to restore that segment. However, in most cases, particularly when the memory is being used as a backing store for a buffer memory, the necessity to inhibit accesses to accomplish a required restoration should be infrequent.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figures 1, 2:
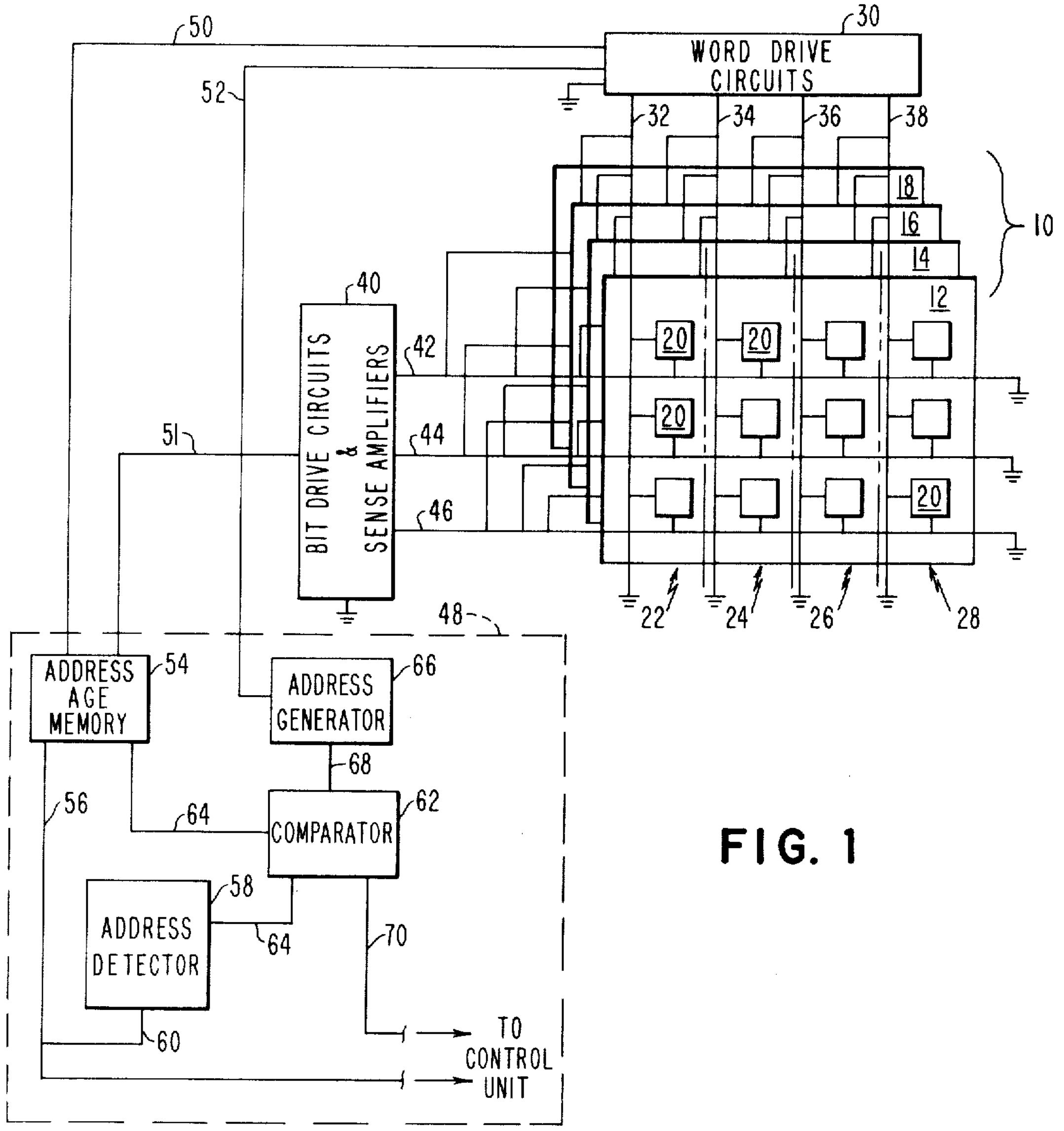
FIG. 1 is a generalized block diagram of a memory system in accordance with the invention.
FIG. 2 is a table useful in explaining operation of the memory system in FIG. 1.

Turning now to the drawings, more particularly to FIG. 1, a generalized memory system in accordance with the invention is shown. A memory array 10 consists of planes 12, 14, 16 and 18. Each of the planes 12 through 18 has a plurality of memory elements 20 in it. These memory elements may be, for example, capacitive storage elements gated by field effect transistors, as in the above referenced Dennard patent, the disclosure of which is incorporated by reference herein. The memory elements 20 on each plane 12 through 18 are divided into segments, each segment 22, 24, 26 and 28 consisting of a column of the memory elements 20. Segments in a corresponding position in each plane 12 through 18 are connected in parallel. Thus, if the first segment 22 on plane 12 is addressed, the first segment of planes 14, 16 and 18 is accessed as well. The memory elements 20 in segments 22 through 28 are connected to word drive circuits 30 by line 32, 34, 36 and 38, respectively. Similarly, bit drive circuits and sense amplifier 40 is connected to the three rows of memory elements 20 on each plane 12 through 18 by lines 42, 44 and 46. For ease of understanding, separate physical planes and a small number of memory elements have been shown. It should be recognized that two or more planes as described herein could appear on a single physical substrate, e.g., a silicon integrated circuit chip. An actual memory system might contain as many as several million memory elements 20.

In practice of this invention with a random access memory array of the type shown in FIG. 1, restoration of information stored in the memory array is most conveniently accomplished one word line at a time. Consequently, restoration control 48 is connected to word drive circuits 30 of the array by lines 50 and 52. Restoration control 48 includes an address age memory 54, which stores the addresses of segments 22 through 28 in a time ordered sequence based on their last restoration. An address to be access in the memory array is accessed to the address age memory 54 by line 56. Address detector 58 is connected to incoming address line 56 by line 60, and to comparator 62 by line 64. Comparator 62 is connected to address age memory 54 by line 64 and to address generator 66 by line 88. Memory status line 70 is connected to comparator 62.

In operation, an incoming address of a segment 22–28 of the memory array 10 to be accessed is supplied on line 56. The presence of the address on line 56 is detected by address detector 58 through line 60. If an address is detected, address detector 58 carries out no further function during that time interval.

Let it be assumed that an address is supplied on line 56 to address age memory 54. at this point, address age memory 54 supplies the age of the least recently restored address to comparator 62 on line 64. Stored within comparator 62 is the maximum possible address age that is permitted in memory array 10 without risking loss of information stored at that address. If the age of the least recently restored segment 22 through 28 of array 10 is less than the maximum permissible address age stored in comparator 62, address age memory 54 supplies the incoming address to be accessed to word drive circuits 30 on line 50 and to bit drive circuits 40 on line 51. If it is assumed that the address is for the memory bits at the intersections of word line 32 and bit line 42, the result is that the requested access is made and information is written into or read out of these bits on each plane 12 through 18. Simultaneously, all of the memory bits in segment 22 of memory array 10, including the accessed bits, are additionally read out and then written back into their storage positions to restore their information. Assuming that the memory bits 20 contain capacitive storage elements gated by field effect transistors, those capacitors having a charge stored on them have that charge restored to its initial voltage. The time ordered sequence of memory segments 22 through 28 stored in address age memory 54 for restoration is then updated to indicate that segment 22 has been most recently restored. This concludes a normal access and regeneration in the memory system of FIG. 1 and occurs during one cycle time interval of the memory system.

In the next cycle time interval, it is assumed that an address is supplied on line 56, but that a different address of the memory now has an age equal to the maximum permissible age of an unrestored segment as recorded in comparator 62. the age of the oldest segment is supplied to comparator 62 on line 64, comparator 62 indicates that this oldest segment requires restoration in order to maintain viability of its information, and a memory busy signal is supplied on memory status line 70 in order to allow the requested access to be held in a control unit (not shown) to which the memory system of FIG. 1 is connected. An appropriate signal is generated in comparator 62 and supplied on line 68 to address generator 66 to cause the address generator to supply the address of the memory segment 22 through 28 requiring restoration on line 52 to word drive circuits 30 to cause restoration of the information in that segment. The information is read out, then written back into the segment to restore it, as before. Upon completion of the restoration of the segment 22 through 28 requiring restoration, the time ordered sequence of the segments as stored in address age memory 54 is updated to indicate that the segment is now the most recently restored. This concludes a memory access cycle time. The address for which an access was requested, which has been held in the control unit of the memory, is again supplied to address age memory 54 on line 56 in the next cycle time, and if the oldest unrestored segment 22 through 28 in the memory array 10 now does not require restoration, then the access and simultaneous restoration of the segment containing the access is carried out, as in the case of the first cycle time interval.

Another possible situation is that the oldest unrestored memory segment address as stored in address age memory 54 requires restoration but coincides with a requested address to be accessed as supplied on line 56. If this is true, it is desirable that comparator 62 allow this address to be supplied by address age memory 54 on lines 50 and 51 to word drive circuits 30 and bit drive circuits 40 as in the first cycle time discussed, thus again simultaneously restoring the entire segment which must be restored and allowing the requested access.

In a succeeding memory cycle time interval, it is assumed that no address for which an access is requested is supplied on line 56. Address detector 58 determines this by the absence of a signal on line 60. An appropriate signal is sent from address detector 58 to comparator 62 on line 64 to indicate that no access to the memory is requested. Address age memory 54 and comparator 62 then perform essentially a look-ahead operation and select the oldest unrestored segment 22 through 28 of memory array 10 and instruct address generator 66 to supply its address on line 52 to word drive circuits 30. The information in this oldest segment of the memory is then read out to the sense amplifier portion of circuits 40 and written back in by the bit and word drive circuits 30 and 40. At the conclusion of this operation, address age memory 54 is again updated to indicate that the segment just restored is now the most recently restored. Another memory cycle time interval now may begin.

An actual memory system in accordance with the invention will contain a much larger number of memory bits than shown in FIG. 1. An actual memory system might contain 1 million or more bits of information, for example, arranged in planes containing 32 segments, with 1,000 bits of information per segment on each plane. The operation of such an actual memory would be the same as explained for the much smaller array of FIG. 1.

The operation of the memory system in FIG. 1 may be further understood by referring to the table of FIG. 2, showing the operation of the memory of FIG. 1 through 6 cycle time intervals. For perspective, it should be recognized that each of the cycle time intervals T1 through T6 would represent, in a typical embodiment in which a capacitive storage element is gated by a field effect transistor, approximately 300 nanoseconds. In FIG. 2, the first column lists the memory segments as shown in FIG. 1. The second column, headed TO, represents an initial generated sequence in address age memory 54 of FIG. 1 established at power-on time. The remaining columns, headed T1 through T6, represent the time ordered sequence for restoration of segments 22 through 28 as stored in address age memory 54. The two rows at the bottom of FIG. 2, labelled USER ADDRESS and GENERATED ADDRESS at their left hand side, represent the address of a requested access to memory array 10 and an address generated by address generator 66 when no access is requested from the memory or when one of segments 22 through 28 has reached the maximum allowable age without restoration in order to maintain viability of the information, respectively. At time interval TO, the arbitrary time ordered sequence of 3–2–1–0 for segments 22 through 28 is established at power-on, with 0 representing the lowest priority for restoration and 3 representing the highest priority. In the table, it is assumed that a memory segment can go through no more than six cycle time intervals without being restored. At time T1, no requested access is made on line 56 of the system in FIG. 1. Therefore, address generator 66, in response to a signal from comparator 62, generates the address of the segment 22 through 28 having the highest priority for restoration, i.e., segment 22. Segment 22 is restored in the manner previously explained with respect to FIG. 1, and the time ordered restoration sequence of addresses as stored in address age memory 54 is updated as shown in column T1. In cycle time interval T2, an access to segment 26 is requested. A comparison of the time interval since restoration (assumed in this case) of the highest priority segment for restoration shows that it does not equal the maximum permissible number of six cycle times, and the requested access is allowed, thus accomplishing restoration of segment 26 as explained previously. The time ordered sequence for restoration in address age memory 54 is updated as shown in column T2. At cycle time interval T3, an access to segment 22 is requested. Again, the number of cycle times since restoration of the highest priority segment for restoration (segment 24) does not equal the maximum permissible six cycle times, and the requested access is again allowed, thus accomplishing a second restoration of segment 22. The information in address age memory 54 is again updated, as shown in column T3.

At cycle time interval T4, a second access to segment 22 is requested. Since the number of cycles since restoration for the highest priority segment in the time ordered sequence (segment 24) as stored in address age memory 54 is 5, the requested access is allowed. This again accomplishes restoration of segment 22, which has the lowest priority for restoration. The time ordered sequence in address age memory 54 is updated as shown in column T4. At cycle time T5, the number of cycles since restoration of the highest priority segment for restoration now equals 6, and an access is permitted only if a requested access is to an address in segment 24. Whether this is true or not, segment 24 is restored, and the time ordered sequence is updated as shown in column T5. At cycle time interval T6, access to a memory bit in segment 28 is requested, and this access is permitted, with the update of the time ordered sequence as shown in column T6.

It should be recognized that the situation occurring at cycle time interval T5 in FIG. 2, in which a user address request could not be honored in the memory unless the address is within segment 24, will occur relatively infrequently in operation of a memory system incorporating the present invention. For example, in a typical system environment, it has been determined that, with a memory in which one half of the memory operation time is required for restoration and one half is available for using the memory, if the present invention is employed, this ratio can be increased from 50 percent availability and 50 percent unavailability to 90 percent availability and only 10 percent unavailability. Of course, if the memory is not being accessed a significant percentage of the time, this ratio can be increased to a full 100 percent availability through use of a look-ahead refresh as explained previously.

Figure 3:
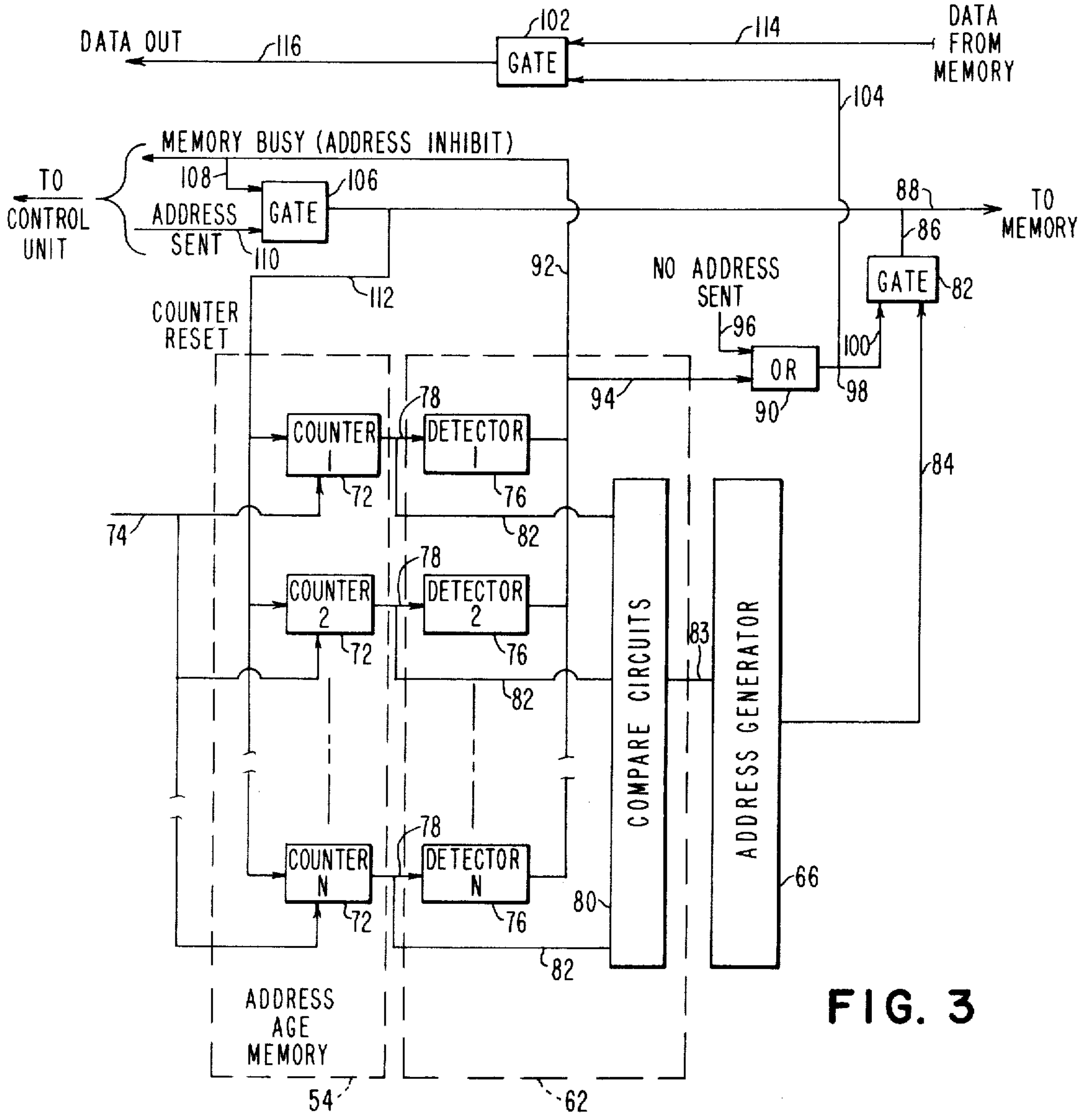
FIG. 3 is a more detailed block diagram of one embodiment of a memory system in accordance with the invention.

FIG. 3 shows in more detailed form a preferred embodiment of restoration control circuitry for a memory system in accordance with the invention, which corresponds generally to restoration control 48 in FIG. 1. As shown, address age memory 54 consists of a plurality of counters 72, with the number of counters being equal to the number of segments in a memory array (not shown) to which the control circuitry is connected. Each counter 72 has one position for each cycle time interval included within the maximum permissible time that a segment of the memory array can retain information without restoration of it, i.e., with M cycle time intervals in that time, counters 72 are modulo M counters. The counters 72 are connected to counter advance line 74 which supplies suitable commands for incrementing each counter one position for each cycle time interval. Comparator 62 has a plurality of M detectors 76, corresponding in number to the number of counters 72. The M detectors detect when any one of the counters 72 reach a value M corresponding to the number of cycles in the restoration interval required for the memory to preserve viability of information stored in it. Each counter 72 is connected to its corresponding M detector 76 by lines 78. Additionally, each counter 72 is connected to compare circuitry 80 by lines 82. Compare circuits 80 are in turn connected by line 83 to address generator 66. Address generator 66 is connected to gate 82 by line 84 and through gate 82 to the memory array (not shown) by lines 86 and 88.

Each M detector 76 is connected to OR circuit 90 by lines 92 and 94. The other input to OR circuit 90 is line 96, which provides a signal if no address is being requested. Output 98 of OR circuit 90 is connected to gate 82 by line 100 and to data inhibit gate 102 by line 104.

Memory status line 92, to which each M detector 76 is connected, is connected to gate 106 by line 108 to the control unit (not shown) for the memory system. Address input line 110 is connected to gate 106, and the output of gate 106 is connected to memory input line 88 and to counters 72 by counter input line 112. Data line 114 is connected to gate 102, the output of which is data output line 116.

In operation of the restoration control circuitry of FIG. 3, the address of a requested access is supplied from the control unit for the memory system on line 110 to gate 106. The contents of each counter 72 are checked by their corresponding M detector 76 to see if any segment of the memory array requires restoration. If the contents of all counters 72 are less than M, no inhibit signal is supplied to gate 106 on line 108, and the address of the requested access is supplied to the memory on memory input line 88. Simultaneously, the address is supplied on line 112 for initializing the counter corresponding to the segment of the memory array containing the address for which access is requested. An appropriate signal on counter advance line 74 increments the remaining counters 72 by one. The address is supplied on line 88 to drive circuits (not shown) for the memory to either write in information or read it out on data line 114. The function of data inhibit gate 102 is to prevent data from being supplied on data output line 116 when no access is requested or a requested access is inhibited to allow a required restoration of another segment of the memory. Assuming no signal is supplied on line 96 to indicate that no address of an access is requested or that a requested access has not been inhibited, no inhibit signal is supplied to gate 102 on line 104, and the data passes through gate 102 to data output line 116. In either event, the effect is to restore the segment of the memory containing the bit addressed.

Let it now be assumed that one of the counters 72 contains a number equal to M, the maximum permissible number of cycle times that a memory segment may go without restoration. An appropriate signal on line 108 to gate 106 prevents an address to which an access is desired from being supplied to memory input line 88. An appropriate signal on one of lines 82 causes address generator 66 to generate the address of the segment requiring restoration. The M detector 76 corresponding to this memory segment sends an enabling pulse on line 94 through OR circuit 90 to line 100 connected to gate 82. Gate 82 is enabled, thus allowing the generated address of the segment requiring restoration to be supplied to the memory on line 88.

Figure 4:
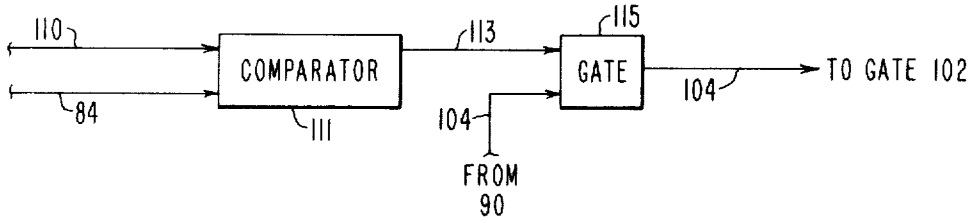
FIG. 4 is a block diagram of a modification to the memory system shown in FIG. 3.

A simple modification, shown in FIG. 4, of the circuitry in FIG. 3 will allow an access to take place if the address of the requested access is contained within the segment requiring restoration. Line 110, in addition to being connected to gate 106 as shown in FIG. 3, is connected to a comparator 111. Line 84, shown connecting the output of address generator 66 and gate 82 in FIG. 3, is also connected as the outer input of comparator 11, to allow comparing the address of a requested access supplied on line 110 and the address of a segment requiring restoration, as generated by address generator 66. A gate 115 is inserted in line 104 between output 98 of OR circuit 90 and gate 102. Output 113 of comparator 111 acts as a control of gate 115. The output of gate 115 acts as a control for gate 102.

In operation, if a segment of the memory requires restoration, address generator 66 generates the address of that segment as before, and supplies it as one input to comparator 111. The address of a requested access is supplied on line 110 as the other input to comparator 111. If the two addresses compare, an appropriate signal on line 113 inhibits gate 115, thus preventing an inhibit signal from being supplied on line 104 to disable gate 102, and allowing data on line 114 to go through gate 102 and out of line 116. If the two addresses do not compare, which would be the usual case, an appropriate signal on line 113 enables gate 115, and an inhibit signal is supplied to disable gate 102.

Let it now be assumed that no address of a requested access is supplied to gate 106 on line 110. In such a case, it is desirable to perform a "look-ahead" operation to restore that portion of the memory which will require restoration the most. An appropriate signal indicating that no address is being sent is supplied on line 96 to OR circuit 90 to enable it. The contents of counters 72 are compared in compare circuits 80, and the address of the segment corresponding to the counter with the highest number is generated in address generator 66. This address is supplied on line 84 to gate 82, which has been enabled by OR circuit 90 due to the signal on line 96, to line 88, and thence to the memory drive circuits. Again, a simple read out-write in operation is performed to restore the information in the address segment.

Figure 5A:
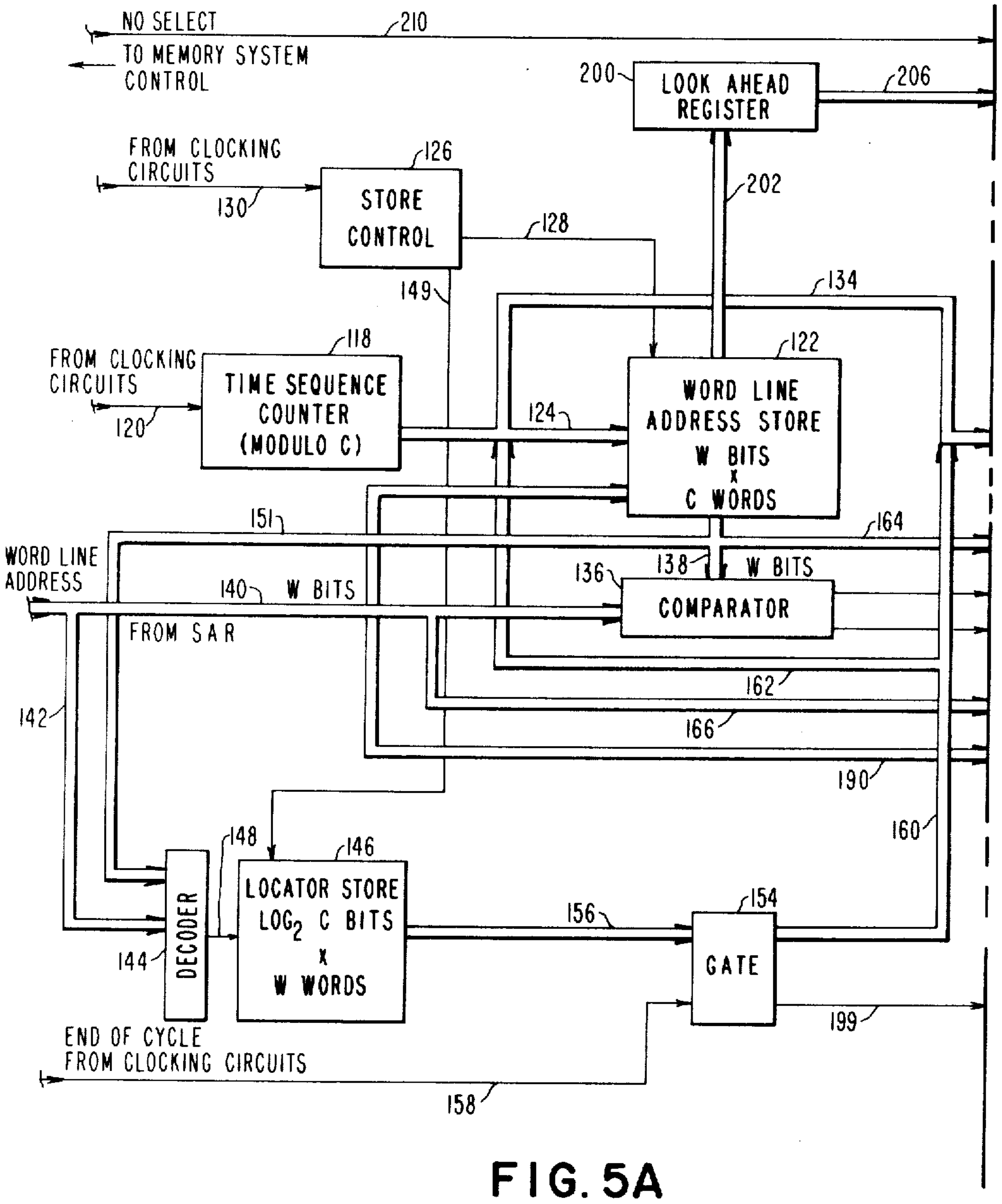
FIG. 5 is a block diagram of another embodiment of a memory system in accordance with the invention.
Figure 5:
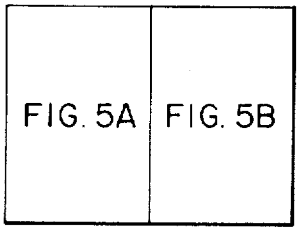
Figure 5B:
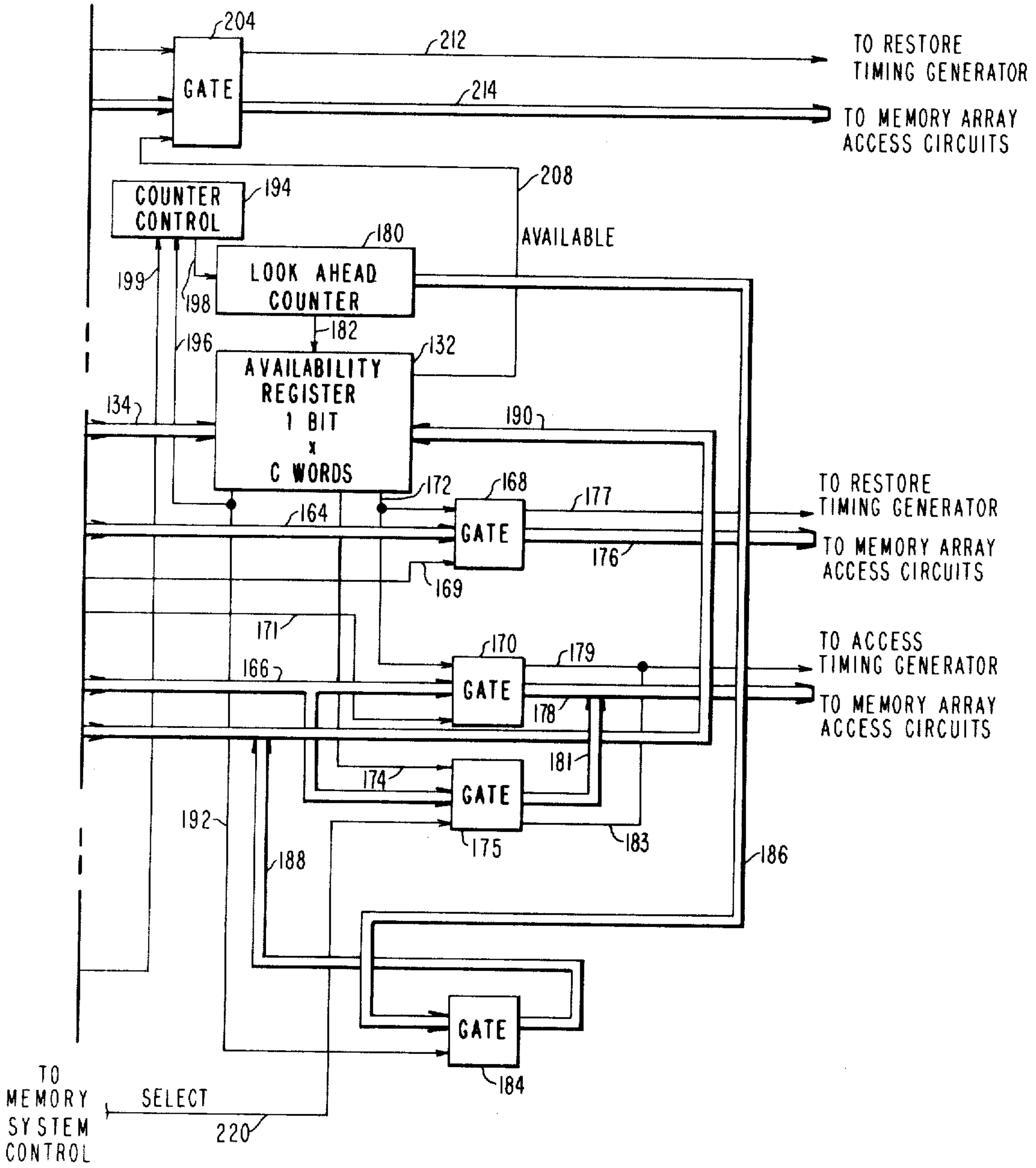

FIGS. 5A and 5B illustrates another embodiment of memory system restore control circuitry for a system in accordance with the present invention. In the following discussion, it will be assumed that the length of time information may be stored in the memory of the system without restoration corresponds to C cycles and that the memory is restored by word lines, with the number N of word lines being substantially less than C, e.g., one half or less of C. The system has a time sequence counter 118 which counts from zero to C-1, then cycles back to zero and repeats the count, as indicated by the designation modulo C. Counter 118 is connected to clocking circuits for the memory system (not shown) by line 120. Counter 118 serves to keep track of which of C cycles the memory system has reached and is incremented by the clocking circuits for each cycle. Counter 118 is connected to word line address store 122 by bus 124. Word line address store 122 is configured to allow an address of length W to be assigned to each of cycles 0 through C-1 and allow its address of length W to be stored in it. Only N of the cycles 0 through C-1 actually have a word line address assigned to them for restoration during that cycle. The remaining cycles have no preassigned word line address for restoration. Store control 126 is connected to word line address store 122 by line 128, and to the clocking circuits (not shown) by line 130. Time sequence counter 118 is also connected to availability register 132 by bus 134. Outputs from word line address store 122 are connected to comparator 136 by bus 138, and to decoder 144 by bus 151.

Address bus 140 connects comparator 136 and storage address register (not shown) of the memory system. Bus 142 connects address bus 140 with decoder 144, the output of which is connected to locator store 146 by lines 148. Locator store 146 contains the location in time sequence 0 to C-1 for each word line. Locator store 146 is configured to contain the $\log_2$ of C bits by W words, i.e., six bits if C equals 64 cycles. A preferred embodiment is word line address store 122 and locator store 146 combined in an associative memory. Line 149 connects locator store 146 and store control 126. The output of locator store 146 is connected to gate 154 by bus 156. Control of gate 154 is supplied on line 158, the other end of which is connected to the memory system clocking circuits (not shown). The principal output of gate 154 is supplied on bus 160, the other end of which is connected to bus 134, which connects time sequence counter 118 and availability register 132. Bus 162 also connects the output of gate 154 to bus 124, which connects counter 118 and word line address store 122.

Buses 164 and 166 provide outputs from word line address store 122 to gate 168 and from bus 140 to gates 170 and 175, respectively. Gates 168 and 170 are connected to availability register 132 by line 172. Gate 175 is connected to availability register 132 by line 174. Control for gate 175 is connected to select line 220, the other end of which is connected to memory system control (not shown). Comparator 136 is connected to gate 168 by line 169, and to gate 170 by line 171. Output buses 176, 178 and 181 of gates 168, 170 and 175 are connected to memory array access circuits (not shown). Output lines 177 and 179 from gates 168 and 170 are connected to a restore timing generator (not shown) and an access timing generator (also not shown). Output line 183 from gate 175 is also connected to the access timing generator through line 179.

For restoration in non-access cycles, look ahead counter 180 is connected to availability register 132 by line 182 and to gate 184 by bus 186. The output of gate 184 is connected to word line address store 122 and to availability register 132 by buses 188 and 190. The control of gate 184 is connected to availability register 132 by line 192. Counter control 194 is connected to availability register by line 196. Counter control 194 is also connected to look ahead counter 180 by line 198 and to an output of gate 154 by line 199. Look ahead register 200 is configured to contain the address of a word line to be restored during non-access cycles and is connected to word address store 122 by bus 202. The output of look ahead register 200 is connected to gate 204 by bus 206. Control for gate 204 is connected to availability register 132 by line 208 and to memory system control (not shown) by NO SELECT line 210. Outputs from gate 204 are connected to restore timing generator by line 212 and to memory array access circuits (not shown) by bus 214.

In operation of the system of FIGS. 5A and 5B, let it first be assumed that an access is requested in a cycle. The address of the access is supplied on bus 140 from the memory system control storage address register (not shown) to comparator 136. Simultaneously, the address is supplied on bus 142 to decoder 144, and thence to locator store 146 on line 148 to determine the present location of the addressed word line in word line address store 122. Locator store 146 supplies the C bits necessary to locate the addressed word line on bus 156 to gate 154 under control of store control 126. At the end of the cycle, a pulse on line 158 gates the word line address to word line address store 122 and availability register 132 by buses 160 and 134 to update their contents under control of store control 126.

Simultaneously with the supplied address on bus 140, pulses on lines 120 and 130 initiate operation of store control 126 and time sequence counter 118 for this cycle. Store control 126 initiates operation of both word line address store 122 and locator store 146 by pulses on lines 128 and 149, respectively. Counter 118 supplies the identification of this cycle in the sequence 0 through C-1 on bus 124 to word line address store 122 and on bus 134 to availability register 132. Word line address store 122 in turn supplies the address of the word line (if any) that has been assigned for restoration during this cycle to comparator 136 on bus 138. If the address for which an access is requested and the address assigned to this cycle for restoration compare, a signal appears on line 171 and enables gate 170. If the requested address and the assigned address (if any) differ, a signal appears on line 169 and enables gate 168. Simultaneously, availability register 132 provides an indication of refresh required (non-available) on line 172 or access allowed (available) on line 174 for this cycle as indicated by time sequence counter 118. If the presently identified cycle contains a word line address requiring refresh, availability register 132 supplies a signal on line 172 to gates 168 and 170. If comparator 136 has indicated a comparison on line 171, only gate 170 is enabled and the requested address on bus 166 is gated through gate 170 onto bus 178 because this access also accomplishes restoration of the word line requiring restoration this cycle. Line 179 initiates the required access timing pulse train. If comparator 136 has indicated no comparison by a signal on line 169, only gate 168 is enabled. The address of the word line requiring a restoration is gated from bus 164 to bus 176 to restore that word line. Line 177 initiates the required restore timing pulse train. The requested address is held in the memory system storage address register (not shown) for the next memory cycle. If the present cycle requires no restoration of any word line availability register 132 supplies a signal on line 174 to gate 175. Gate 175 is enabled by the select line and line 174. Since no restoration is required, the accessed address is gated through gate 175 and appears on bus 178. Again, line 179 initiates the required access pulse train.

If no access is made in a cycle, and no word line requires restoration in that cycle, it is advantageous to have the system look ahead to the next cycle in which a restoration will be required. An appropriate signal on line 158 through gate 154 to line 199 starts counter control 194 to initiate a look ahead operation each cycle to find the next cycle in which a restoration is required. When a cycle is reached by looking ahead in which a restoration is required, an appropriate signal from availability register 132 on line 196 will stop counter control 194. In the absence of a pulse on line 196, look ahead counter 180 steps forward until it reaches the cycle requiring restoration, then supplies the identification of that cycle on bus 186 to gate 184, through gate 184 to bus 188, thence to bus 190 and to word line address store 122. Word line address store 122 supplies the address of the word line corresponding to he identified future cycle to look ahead register 200 on bus 202 and decoder 144 on bus 151. Decoder 144 supplies the identified cycle to locator store 146 for updating. Locator store 146 will be updated to show in which cycle the word line requiring restoration is actually restored, i.e., the next available cycle in which the memory is not accessed. Look ahead register 200 in turn supplies the address on bus 206 to gate 204. If in fact no access is requested this cycle, an enabling pulse on line 210 enables gate 204 to allow the look ahead address to be supplied on bus 214 to the memory array access circuits. If an access is requested, no enabling pulse is supplied on line 210, and the look ahead address is retained in look ahead register 200.

A noteworthy feature of the system embodiments of this invention above is that, for each cycle, the appropriate inputs to a memory array for the different possible situations can be determined prior to each cycle, then only the input appropriate for the situation actually occurring the following cycle is gated to the memory array. The result is no more complex circuitry, and a considerably shorter response time in the restoration circuitry. As a result, practice of the present time ordered restoration can be carried out without increasing memory cycle time to allow for it.

It should now be apparent that the present invention provides a memory system and method for its operation capable of carrying out the stated objects of the invention by allowing restoration of information in the memory on a priority determined by the time of last restoration for the memory elements. The result is that, in a usual system environment, the necessity to inhibit a requested access for carrying out a restoration in order to prevent loss of information stored in a portion of the memory should occur very rarely, if ever.

While the invention has been particularly shown and described with reference to preferred embodiments thereof, it will be understood by those skilled in the art that various changes in form and detail may be made therein without departing from the spirit and scope of the invention.

What is claimed is:

1. A memory system comprising:

A. An array of addressable memory cells in which stored information must be restored after a predetermined number of memory cycles, said array being divided into a plurality of addressable segments, the memory cells of each segment being restored as a group;

B. accessing means for selectively accessing the memory cells in said array, said accessing means causing restoration of all memory cells associated with the segment containing an accessed memory cell;

C. pulse source means for providing a signal for each memory cycle;

D. priority determining means for providing the addresses of the segments in said array in the order of their last restoration, said priority determining means updating the list each memory cycle; and E. restoration means responsive to said pulse source means for restoring the memory cells in each segment of said array in a plurality of time intervals each time interval being equal to a memory cycle, there being a greater number of time intervals than required for restoration of all of the segments, said restoration means being independently actuable during each time interval in the absence of an access to any segment of said array to restore segments of said array in accordance with the address provided by said priority determining means.

2. The memory system of claim 1 in which said memory array comprises capacitance storage elements.

3. The memory system of claim 2 in which the capacitive storage elements are gated by field effect transistors.

4. The memory system of claim 1 in which said segment list maintaining means comprises an associative memory.

5. The memory system of claim 1 in which said priority determining means comprises a plurality of counters, one counter being provided for each segment in said array each counter being incremented for each memory cycle in the absence of an access to a memory cell in a particular segment.

6. In a memory of the type in which information must be periodically restored in order to maintain viability of the information, the improvement comprising:

A. a plurality of segments in a memory array, the memory cells of each segment being restored as a group, B. segment list maintaining means for maintaining a time ordered sequence of said segments in the order of their last restoration, and C. means for restoring the memory cells in one of the segments of said array in one of a plurality of memory cycles, the number of memory cycles exceeding the number of segments, said means for restoring being actuated for a particular segment of said array each time an access to a portion of said array within that segment is made, and being independently actuable during each memory cycle in the absence of an access to any segment of said array to restore segments of said array in accordance with the time ordered sequence.

7. The memory of claim 6 in which said memory array comprises capacitive storage elements gated by field effect transistors.

8. The memory of claim 6 in which said segment list maintaining means comprises an associative memory.

9. The memory of claim 6 in which said segment list maintaining means comprises a plurality of counters, one counter being provided for each segment in said array.

10. A process for operating a memory in which stored information must be restored periodically in order to maintain its viability, which comprises:

A. dividing said memory into a plurality of addressable segments,

B. establishing a time ordered list of the addresses of the segments in the sequence of their last restoration, C. restoring a segment of the memory during each memory cycle in which an access to a portion of said memory within the segment is made, and D. restoring that segment of the memory least recently restored during each memory cycle in which no access to said memory is being made.

11. The process of claim 10 additionally comprising:

E. inhibiting access to the memory during a memory cycle in which the maximum length of time that a segment may retain information without losing its viability has occurred for one of the segments.

12 A memory system comprising:

A. An array of addressable memory cells in which stored information must be restored within a predetermined number of memory cycles, said array being divided into a plurality of addressable segments, the memory cells of each segment being restored as a group;

B. accessing means for selectively accessing the memory cells in said array, said accessing means causing the restoration of all of the memory cells within the segment containing accessed memory cells;

C. pulse source means for providing a signal for each memory cycle;

D. priority determining means responsive to said pulse source means for providing, during each memory cycle, the address of the segment in said array restored least recently, said priority determining means being updated each memory cycle as a particular segment is restored; and E. restoration means for restoring the memory cells within a segment, said restoration means being responsive to said pulse source means and said accessing means to provide restoration of the segment determined by said priority determining means in each memory cycle in the absence of an input from said accessing means.

13. The memory system of claim 12 further including, comparator means associated with said priority determining means for providing an indication when a particular segment of said array has been unrestored for said predetermined number of cycles; and access inhibiting means responsive to said comparison means for preventing an access to said array of memory cells during the memory cycle said comparison means is active, said restoration means causing the restoration of said particular segment during said memory cycle.

14. The memory system of claim 13 further including address comparison means for comparing the address of accessed memory cells with the segment address provided by said priority determining means, and means responsive to said address comparison means for allowing an access when the segment required to be restored has the same address as the accessed memory cells.

15. A memory system comprising:

A. An array of addressable memory cells in which information must be restored within C memory cycles, said array being divided into N addressable segments, where N is less than C, the memory cells in each segment being restored as a group; B. accessing means for accessing said memory cells, said accessing means being responsive to memory cell addresses provided by a memory system control address register, said accessing means also causing the restoration of all of the memory cells within the segment containing accessed memory cells;

C. memory cycle timing means for providing timing pulses each memory cycle;

D. segment address storage means for storing the address of each of said N segments in a time ordered sequence, each segment address being associated with a different one of said C memory cycles, said segment address storage means being accessed by memory cycle number;

E. access availability register means for providing an indication of the restoration status of said system on a memory cycle basis, said register means being updated at least for each memory cycle in which memory cells are restored by said accessing means;

F. time sequence counter means responsive to said memory cycle timing means for providing access to the contents of said segment address storage means and said access availability register means for each of said C memory cycles;

G. restore means for restoring the memory cells in each of said segments, said restore means being responsive to a segment provided by said segment address storage means; and H. first and second means responsive to said access availability register means, said first gate means operative for a particular cycle indicated by said timing sequence counter to enable said restore means on the condition that said access availability means indicates that said particular memory cycle is unavailable for an access, said second gate means operative to enable said accessing means on the condition that said access availability means indicates that said particular memory cycle is available for access.

16. The memory system of claim 15 further including, comparator means for comparing at least a portion of an address provided by said memory system control address register and the contents of said segment address storage means corresponding to said particular memory cycle; and third gate means responsive to said comparator means and said access availability register means operative to enable said accessing means on the condition that the input to said comparator means are equal and said access availability register means indicates that said particular cycle is unavailable, said first gate means also being responsive to said comparator means to be operative on the additional condition that the inputs to said comparator means are unequal.

17. The memory system of claim 15 further including, look ahead counter means responsive to said memory cycle timing means for scanning the contents of said access availability register to determine the memory cycle number of the next unavailable memory cycle, said look ahead counter means providing said next unavailable memory cycle number as an input to said segment address storage means, look ahead register responsive to said segment address storage means for receiving the address of the segment corresponding to said next unavailable memory cycle, and fourth gate means for enabling said restore means to restore the segment corresponding to the address in said look ahead register, said fourth gate means being responsive to a no access request signal from said memory system control and being operative on the condition that said access availability register means indicates that said particular memory cycle is available for access.

* * * * *

PO-1050
(5/69)

UNITED STATES PATENT OFFICE
CERTIFICATE OF CORRECTION

Patent No. 3,811,117 Dated May 14, 1974

Inventor(s) Robert Douglas Anderson, Jr. and Howard Leo Kalter

It is certified that error appears in the above-identified patent and that said Letters Patent are hereby corrected as shown below:

Column 14, line 46, Claim 15, Paragraph G, after "segment" insert --address--; line 48, Claim 15, Paragraph H, after "second" insert --gate--.

Signed and sealed this 22nd day of October 1974.

(SEAL)
Attest:

McCOY M. GIBSON JR.
Attesting Officer

C. MARSHALL DANN
Commissioner of Patents